US005299599A

United States Patent [19]

Farmer et al.

[11] Patent Number: 5,299,599

[45] Date of Patent: Apr. 5, 1994

[54] VALVING ARRANGEMENT FOR A NEGATIVE PRESSURE VENTILATOR

[75] Inventors: Robert B. Farmer, Boulder; John T. Shackelford, Longmont, both of Colo.

[73] Assignee: Lifecare International, Inc., Lafayette, Colo.

[21] Appl. No.: 946,897

[22] Filed: Sep. 17, 1992

[51] Int. Cl.[5] ..................... F16K 11/085; A61H 31/02

[52] U.S. Cl. .......................... 137/625.22; 137/625.21; 137/625.46; 601/44

[58] Field of Search ...................... 137/625.21, 625.22, 137/625.24, 625.46, 625.47; 128/30, 30.2

[56] References Cited

U.S. PATENT DOCUMENTS

| | | | |
|---|---|---|---|
| Re. 24,357 | 9/1957 | Emerson | 128/30.2 |
| 1,172,660 | 2/1916 | Armbruster | 128/30.2 X |
| 2,466,108 | 4/1949 | Huxley | 128/30 |
| 2,480,980 | 9/1949 | Terhaar | 128/30.2 |
| 2,629,372 | 2/1953 | Wallin | 128/30.2 |
| 2,772,673 | 12/1956 | Huxley | 128/30.2 |
| 2,780,222 | 2/1957 | Polzin et al. | 128/30 |
| 3,078,842 | 2/1963 | Gray | 128/30.2 |
| 4,520,847 | 6/1985 | Baron | 137/625.22 X |
| 4,523,579 | 6/1985 | Barry | 128/30.2 |
| 4,621,621 | 11/1986 | Marsalis | 128/30.2 |
| 4,658,859 | 4/1987 | Backe et al. | 137/625.22 X |
| 4,770,165 | 9/1988 | Hayek | 128/30 |
| 4,815,452 | 3/1989 | Hayek | 128/30.2 |
| 4,881,527 | 11/1989 | Lerman | 128/30.2 |
| 4,915,132 | 4/1990 | Hodge et al. | 137/625.41 |
| 4,945,899 | 8/1990 | Sugiyama et al. | 128/28 |
| 5,056,505 | 10/1991 | Warwick et al. | 128/30.2 |

*Primary Examiner*—John Rivell
*Attorney, Agent, or Firm*—W. Scott Carson

[57] ABSTRACT

A valving arrangement primarily designed and intended for use in a negative pressure ventilator system. The valve arrangement has a uniquely designed valve that enables the ventilator to perform a number of operations simply by manipulation of a single, one-piece valve member within a valve housing. The valve housing has multiple inlets and outlets and the valve member can be rotated within it to present a variety of pressure cycles to the patient. In the preferred manner of operation, the present invention selectively applies negative and positive pressures to the patient during different portions of the cycle. In this regard, the valve member is structured so that negative and positive pressures are never at the same time delivered to the patient. The valve arrangement is compact and lightweight. It is also functionally superior to prior designs that can only supply whatever pressure is being created by the blower. In contrast, the valve of the present invention can create pressures from zero to the maximum blower pressures (both negative and positive) by positioning the valve to selectively split the blower pressure (negative or positive) to ambient air.

39 Claims, 12 Drawing Sheets

SECOND VALVE POSITION

THIRD VALVE POSITION

Fig. 9
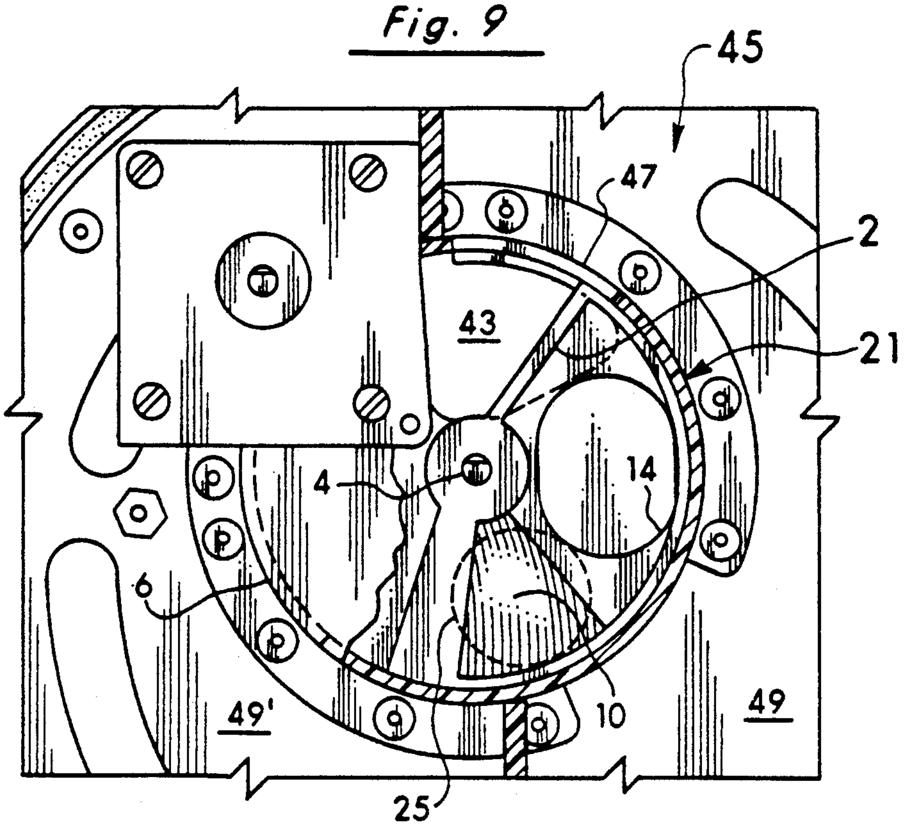
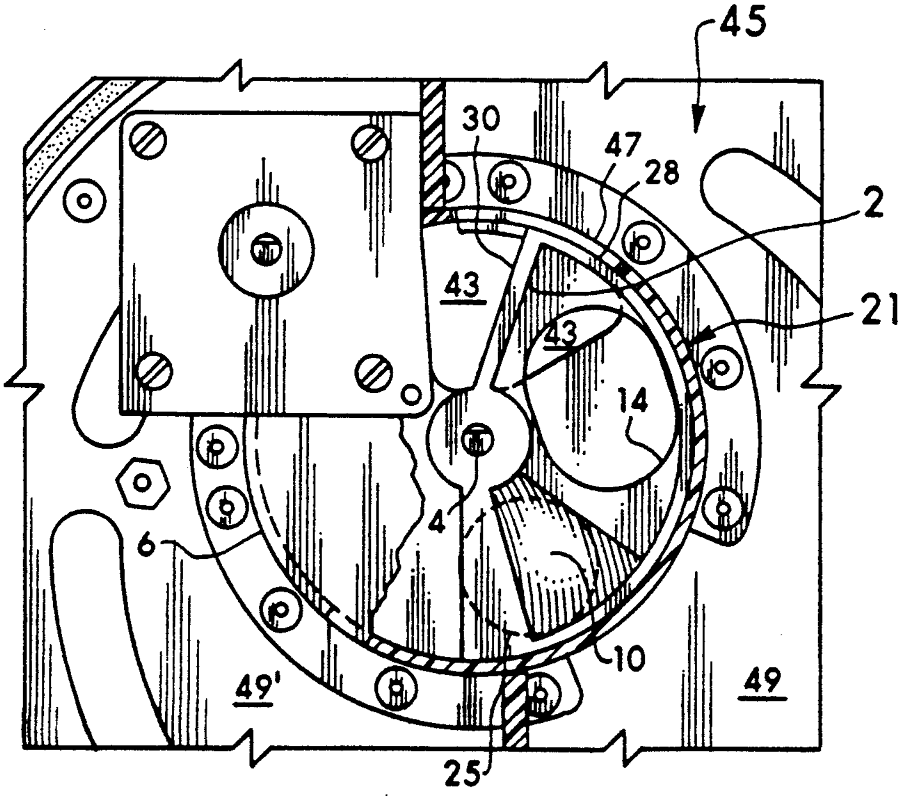
Fig. 10

FIRST VALVE POSITION

SECOND VALVE POSITION

NEUTRAL VALVE POSITION

THIRD VALVE POSITION

OPTIONAL VALVE POSITION

VALVING ARRANGEMENT FOR A NEGATIVE PRESSURE VENTILATOR

BACKGROUND OF THE INVENTION

1. Field Of The Invention

This invention relates to the field of valving arrangements and more particularly, to the field of valving arrangements for negative pressure ventilators and methods for operating them.

2. Discussion Of The Background.

Negative pressure ventilators are widely used to assist patients who cannot breathe on their own or who simply need part-time or full-time assistance in breathing. In many cases, patients only use such negative pressure ventilators at night while they sleep to rest their chest muscles and diaphragm so they can then go through the day unaided.

Negative pressure ventilators essentially can do the work of breathing for the patient. In one common type of ventilator, a shell is placed over the front of the patient's chest. The shell is held in place on the patient by straps with the perimeter edge of the shell substantially conforming to the patient's body to form a seal. The main portion of the shell is spaced slightly away from or above the chest to form a chamber; and, a source of negative pressure such as a turbine fan or other blower is connected to the shell and operated to periodically draw or suck air out of the chamber between the shell and the chest. This action creates a negative pressure in the chamber above the chest (i.e., a pressure slightly less than ambient atmospheric pressure) causing the chest to be expanded upwardly into the chamber and the lungs to be filled with air.

More specifically, to take a breath, a person's chest is normally expanded by his or her own chest muscles and diaphragm to draw in the breath. In doing so, the expansion of the chest actually creates an area of pressure less than atmospheric in the chest cavity itself. The ambient air which is then at a relatively higher pressure simply flows into the lower pressure area of the expanded chest cavity filling the lungs with air. With a negative pressure ventilator, a slightly different principle is used wherein the ventilator does this work of breathing in place of the patient's own chest muscles and diaphragm. In doing so, the ventilator creates a volume of negative pressure (i.e., slightly less than atmospheric) outside of the patient's chest in the chamber between the patient's chest and the shell. The ambient air which is then at a relatively higher pressure seeks this volume of the chamber of negative or lower pressure and in doing so, flows into the patient's mouth and/or nose expanding his chest into the chamber and filling his lungs with air. The negative pressure in the chamber is thereafter reduced or eliminated wherein the patient's expanded chest falls essentially under its own weight to expel the breath from the lungs. This process is subsequently repeated at regular intervals (e.g., twelve times per minute) to simulate normal breathing.

In more sophisticated models of negative pressure ventilators, the exhalation of the breath from the patient's lungs can be aided by supplying a slight positive pressure to the chamber between the shell and the patient's chest. This positive pressure, in turn, assists in collapsing the patient's chest and forcing the air out of the patient's lungs. In most cases, the source of such positive pressure is simply the exhaust of the same turbine fan or blower that is being used to create the negative pressure in the chamber. The design problem then becomes how to connect and control the various flow paths to and from the ventilator in a precise and concise manner to alternately deliver such negative and positive pressures to the chamber between the patient's chest and the shell. The system should also preferably have a dead or neutral position in which neither positive nor negative air is delivered to the user. Further, the periodic delivery or flow of air must preferably be done without connecting the negative and positive sides of the turbine fan or blower at the same time to the chamber between the patient's chest and the shell. Otherwise, the opposing pressures would work against one another trying both to inflate and deflate the patient's lungs at the same time.

Such periodic delivery or flow of negative and positive pressure air into and out of the chamber between the shell and the patient's chest is commonly controlled by any number of valving arrangements. However, all such known ones involve at least two and usually four or even more distinct and separately operated valves or bleeders. This not only adds complexity and bulk to the ventilator but also can make its operation difficult to set and adjust. Further, it may make the inclusion of such desirable operating options as sigh features difficult to do.

With this in mind, the valving arrangement of the present invention was developed. With it, the periodic delivery or flow of negative and positive pressure air into and out of the ventilator and shell can be precisely controlled and adjusted by the operation of a single, one-piece valve member.

SUMMARY OF THE INVENTION

This invention involves a valving arrangement primarily designed and intended for use in a negative pressure ventilator system. The valve arrangement has a uniquely designed valve that enables the ventilator to perform a number of operations simply by manipulation of a single, one-piece valve member within a valve housing. The valve housing has multiple inlets and outlets and the valve member can be rotated within it to present a variety of pressure cycles to the patient. In the preferred manner of operation, the present invention selectively applies negative and positive pressures to the patient during different portions of the cycle. In this regard, the valve member is structured so that negative and positive pressures are never at the same time delivered to the patient. The valve arrangement is compact and lightweight. It is also functionally superior to prior designs that can only supply whatever pressure is being created by the blower. In contrast, the valve of the present invention can create pressures from zero to the maximum blower pressures (both negative and positive) by positioning the valve to selectively split the blower pressure (negative or positive) to ambient air.

BRIEF DESCRIPTION OF THE DRAWINGS

FIG. 9 illustrates the valving arrangement with its valve member turned slightly counterclockwise from the position of FIG. 8.

FIG. 10 illustrates the valving arrangement with its valve member turned slightly counterclockwise from the position of FIG. 9.

DETAILED DESCRIPTION OF THE PREFERRED EMBODIMENTS

Introduction

Figure 1:
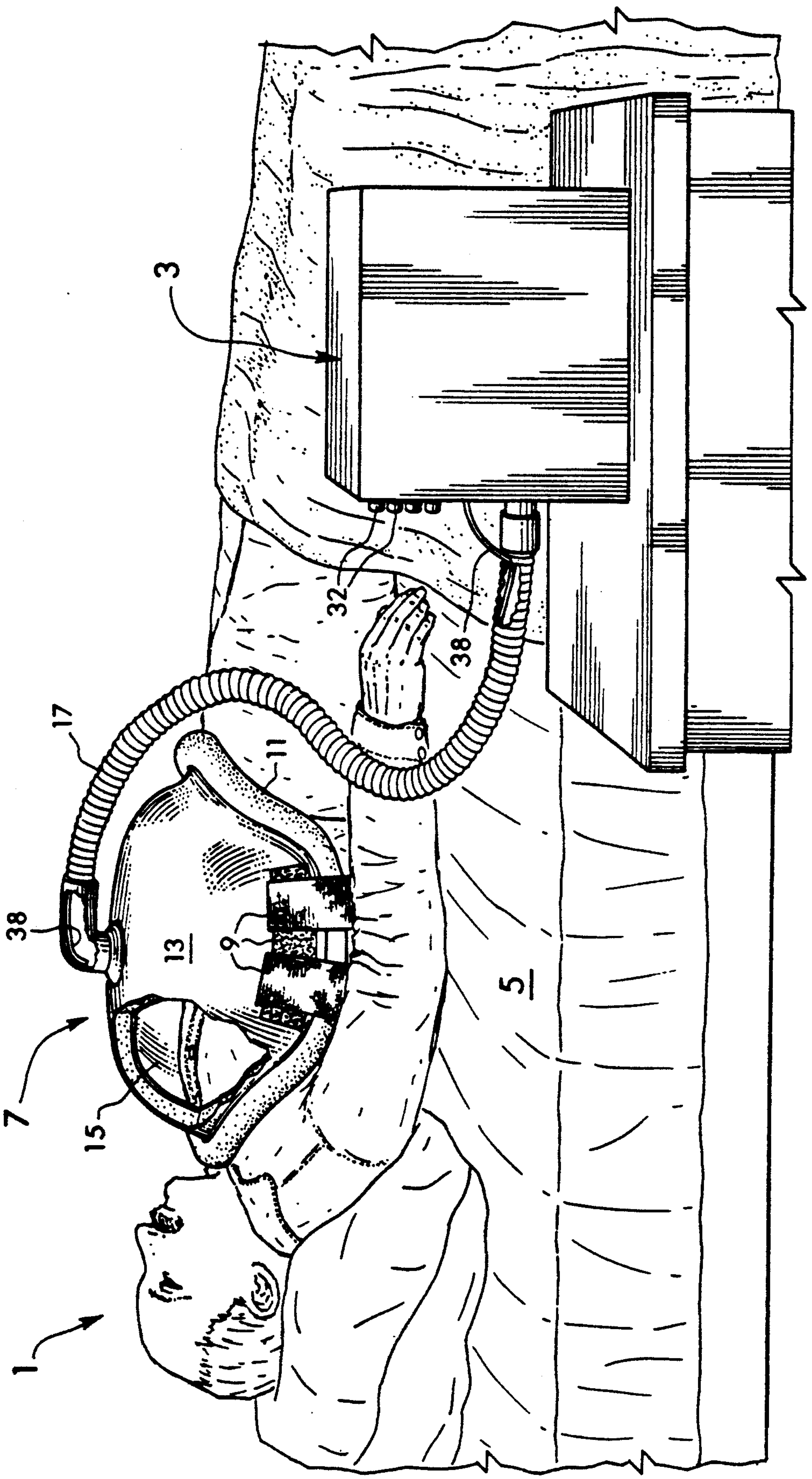
FIG. 1 is a view of a common set-up arrangement for the negative pressure ventilator system of the present invention.

FIG. 1 illustrates a common set-up for assisting a patient 1 to breathe with a negative pressure ventilator 3. In this set-up, the patient 1 is lying supine on the bed 5 and the shell 7 is positioned above his chest. The shell 7 is held in place by Velcro or other removable strap arrangements 9 with the perimeter edge at 11 of the shell 7 substantially conforming to the patient's body to form a seal. The main portion 13 of the shell 7 is slightly spaced from the patient's chest to form a chamber 15. In operation, the negative pressure ventilator 3 periodically draws or sucks air out of the chamber 15 through the connecting tube 17. This causes the patient's chest to be expanded upwardly into the chamber under the influence of the ambient air. That is, the ambient air which is at a relatively higher pressure seeks the lower pressure in the chamber 15. As a consequence, the ambient air enters into and expands the patient's chest into the chamber 15 filling his lungs with air. Upon release of the negative pressure by the ventilator 3, the patient's chest then essentially falls under its own weight to expel the breath from his lungs. This fundamental manner of operation is old and well known.

Figure 2:
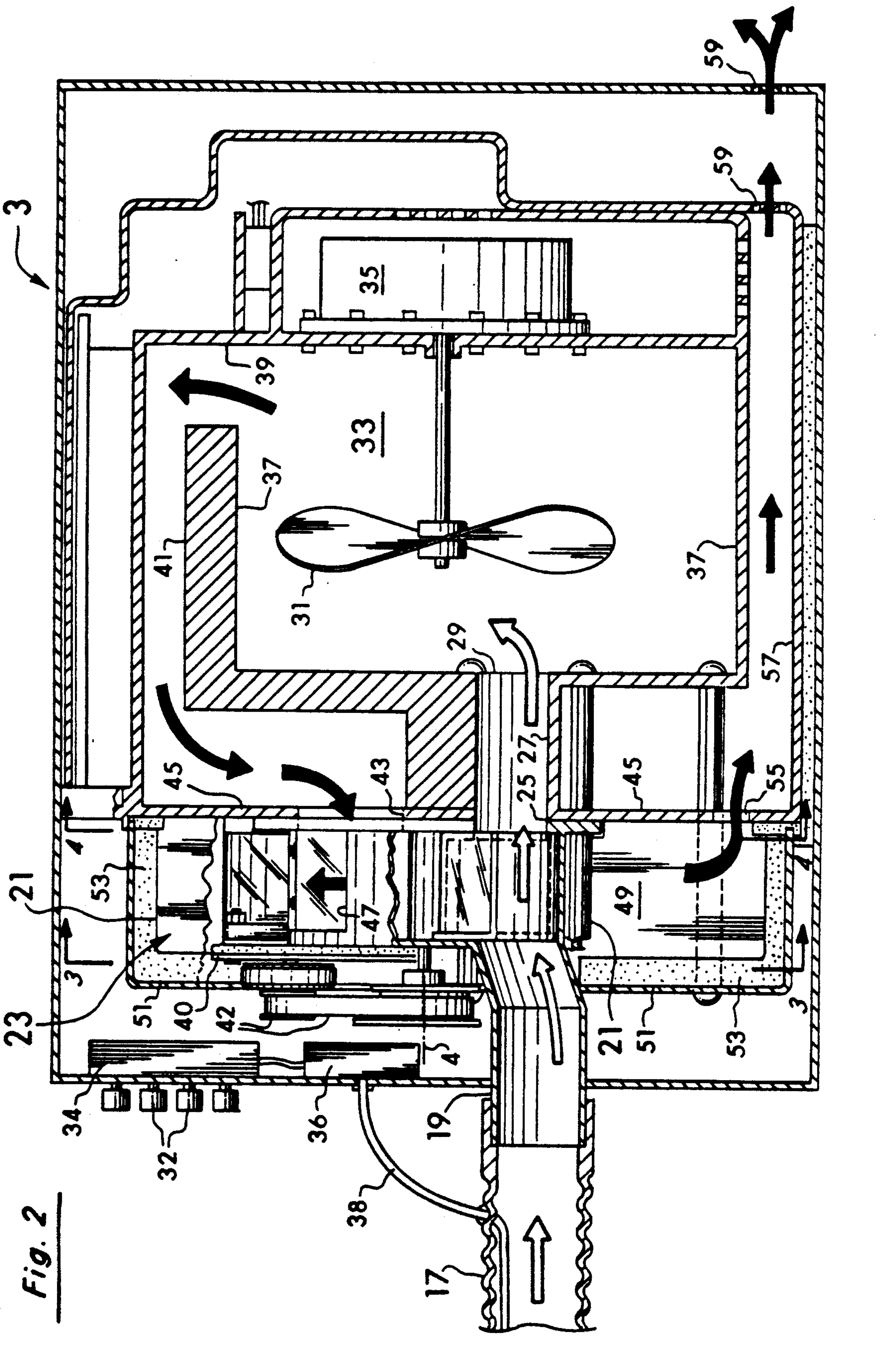
FIG. 2 is a cross-sectional view of the ventilator of the present invention.

The negative pressure ventilator system of the present invention is shown in cross section in FIG. 2. As shown, the connecting tube 17 which is the primary flow channel to the patient is attached in a simple, overlapping manner to the passageway 19. The passageway 19 is part of the valving housing 21 and as illustrated is located at the bottom of the valve housing 21 of the overall valving arrangement 23. In the position of FIG. 2, air is being drawn through the connecting tube or primary flow channel 17 from the shell 7 (FIG. 1) on the patient's chest under the influence of the turbine 31 of the air blower 33. More specifically, the turbine 31 of the air blower 33 is being rotated by the motor 35 to move air through the main body 37 of blower 33. The inlet 29 to the main body 37 of the blower 33 is thus at a negative pressure less than ambient or atmospheric pressure. The outlet 39 is then at a positive pressure greater than ambient or atmospheric pressure. (Such negative pressure relative to ambient pressure is indicated in FIG. 2 and the other drawings by hollow arrows and such positive pressure relative to ambient pressure is indicated in FIG. 2 and the other drawings by solid arrows.)

Figure 3:
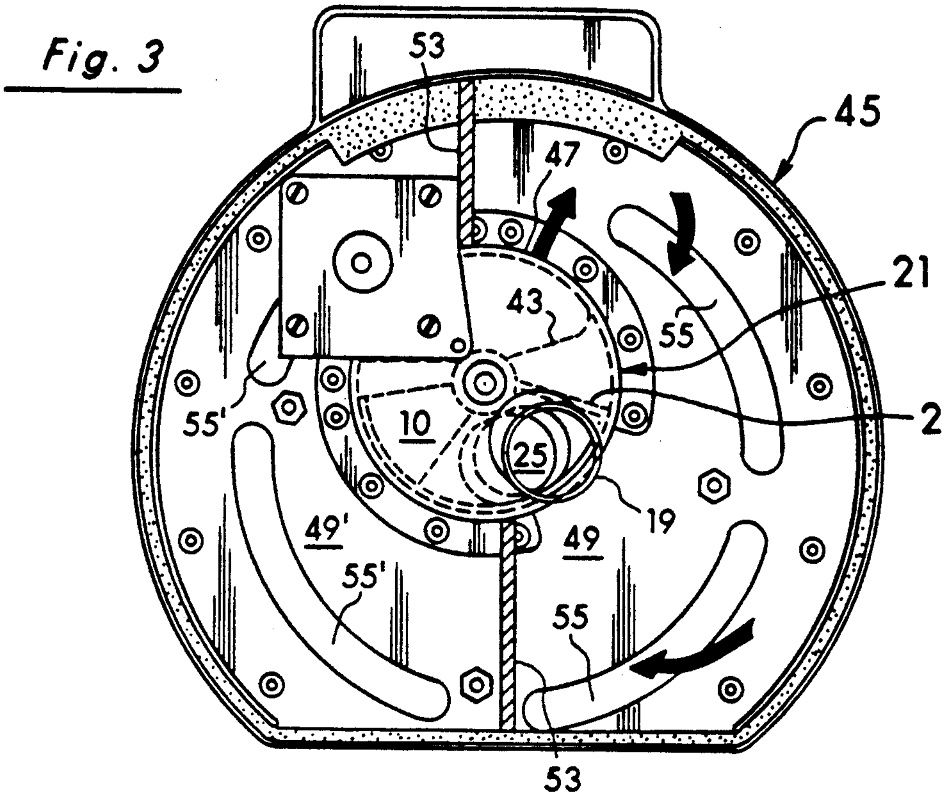
FIG. 3 is a view taken along line 3—3 of FIG. 2.

The three dimensional nature of the valving or control arrangement 23 between the primary flow channel 17 and the blower 33 is somewhat difficult to describe and illustrate simply by reference to only one or two figures. However, suffice it to say at this introductory point in the disclosure that the air flow through the apparatus in the position of FIG. 2 is as follows. Using the shell 7 of FIG. 1 as a beginning reference point, the air flows from the shell 7 through the primary flow channel or connecting tube 17 (see FIG. 2) to the passageway 19 at the bottom of the valve housing 21. From there, the air passes through the bottom of the valve housing 21 in FIG. 2 and out the valve housing outlet at 25 into the flow path 27 which leads to the inlet 29 of the blower 33. Thereafter, the air passes through the main body 37 of the blower 33 to the outlet 39 and through the flow path 41 back into the valve housing 21 through the valve housing inlet 43 in the wall 45. The air then flows out of the valve housing 21 through the valve housing outlet 47. Subsequently, as best seen in FIGS. 2 and 3, the positive pressure air passes from the valve housing outlet 47 into a chamber 49. This chamber 49 surrounds the right half of the valve housing 21 in FIG. 3 and is created or defined by the enclosure formed between the back wall 45 and the cover member 51 with its dividers 53 (see FIGS. 2 and 3). From chamber 49, the air passes through the slots 55 (see FIG. 2) in the wall 45 and along the flow path 57 outside of the main body 37 of the blower 33 where it is vented to atmosphere through vent holes 59.

In this manner, a flow path from the shell 7 through the valve housing 21 to the blower 33 and back through the valve housing 21 to the atmosphere is thus created.

Figure 4:
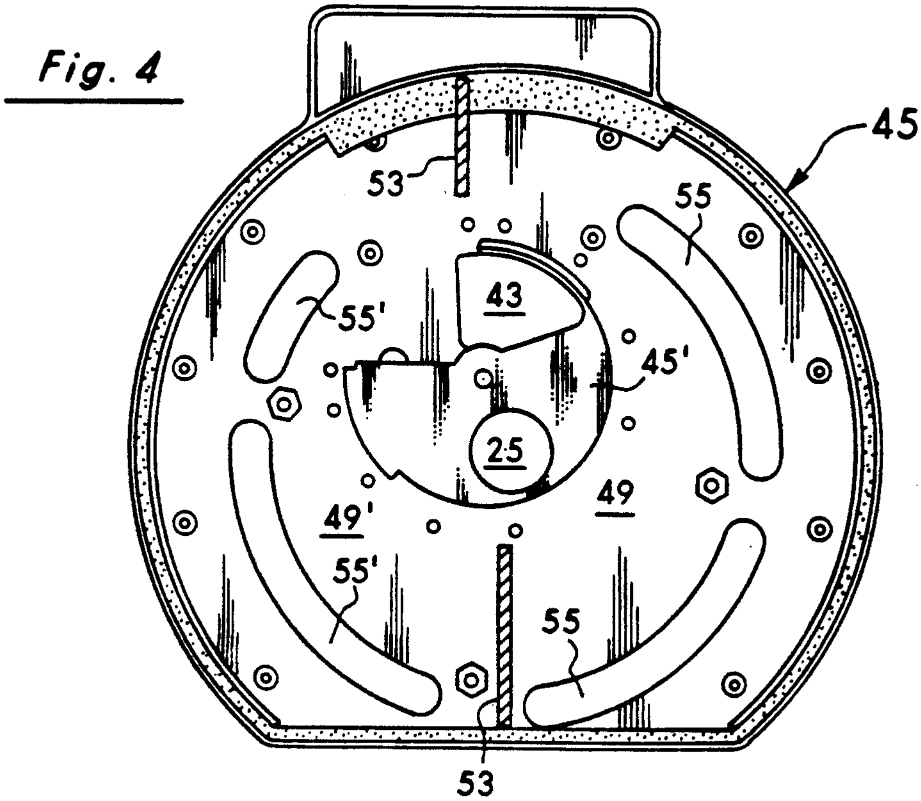
FIG. 4 is a view taken along line 4—4 of FIG. 2.
Figure 5:
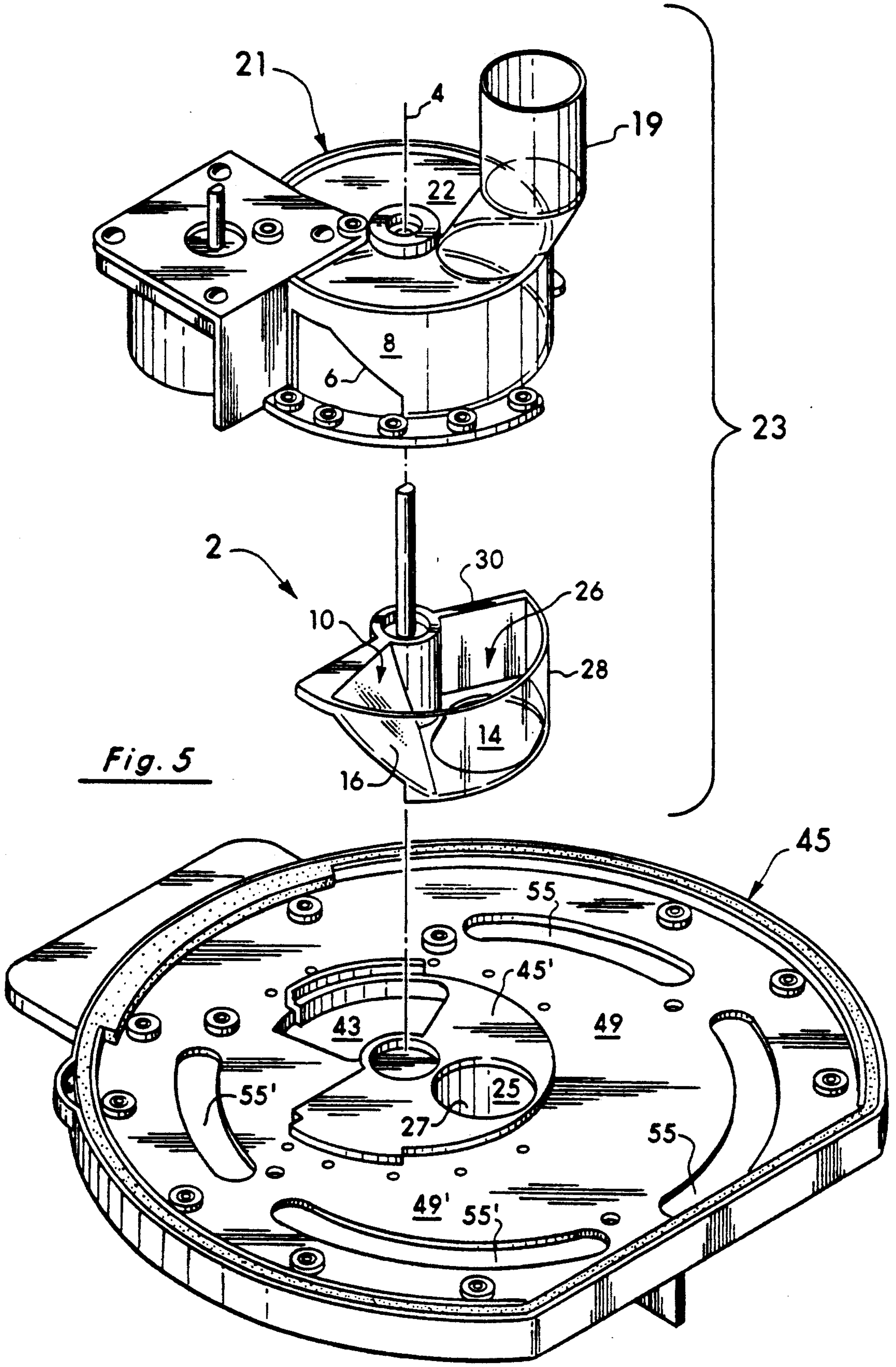
FIG. 5 is an exploded view of the valving arrangement of the present invention.

Referring again to FIG. 2, the wall 45 containing the valve housing inlet 43 performs multiple functions. Among them, the wall 45 functions at portion 45' (see FIGS. 4 and 5) as the back end wall for the valve housing 21. In this regard, the wall 45 at portion 45' provides not only the valve housing inlet 43 as discussed above but also provides the valve housing outlet 25 at the bottom and back of the valve housing 21. FIG. 5 best illustrates this point in an exploded fashion wherein the wall portion 45' with its openings 25 and 43 is shown below the exploded valving arrangement 23. The valving arrangement 23 as illustrated includes the valve housing 21 and the single, one-piece valve member 2 (which is explained in more detail below). Assembly of the exploded parts of FIG. 5 then results in the assemblage in the positions of FIGS. 6 and 7.

Operation Of The Single, One-Piece Valve Member 2

The valving arrangement 23 of the present invention includes the valve housing 21 (see FIG. 5) and the single, one-piece valve member 2. Additionally, the portion 45' of the end wall 45 as explained above forms the back end wall of the valve housing 21 when the valving arrangement 23 is assembled. When assembled, the valve member 2 is mounted as shown (see FIGS. 5-7) within the valve housing 21 for rotation about the axis 4.

In one extreme position of the valve member 2 wherein it is rotated to its far clockwise position (see FIGS. 1-7), a flow path is created from the shell 7 on the patient's chest through the valve housing 21 to the blower 33 and back through the valve housing 21 to atmosphere. In this position, the full negative pressure of the blower 33 is applied to the chamber 15 in the shell 7. In the other extreme position of valve member 2 wherein it is rotated to its far counterclockwise position (skip ahead to FIGS. 11 and 12), the condition exists in which the full positive pressure of the blower 33 is being applied to the chamber 15 in the shell 7.

Figure 6:
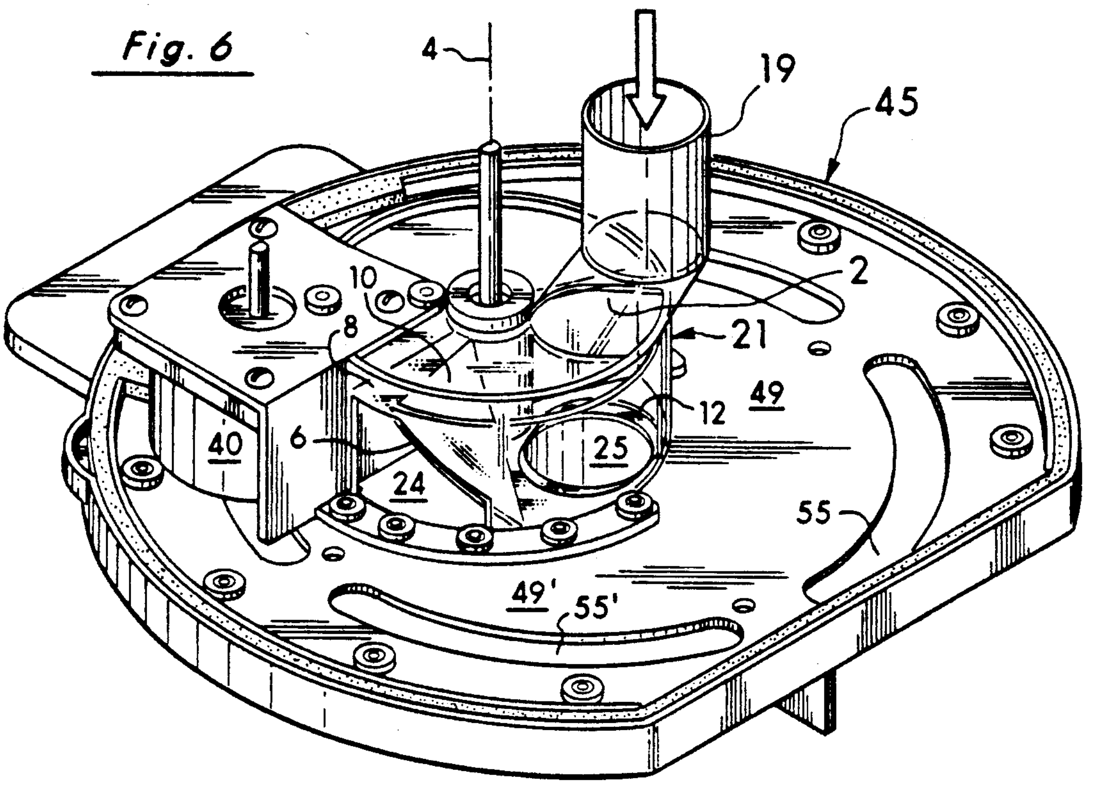
FIG. 6 is a perspective view of the assembled valving arrangement with the rotatable valve member in its extreme clockwise position.

More specifically and referring first back to FIG. 6, the valve housing 21 has a side opening 6 in its cylindrical wall 8. With the cover 51 of FIG. 2 in place, this opening 6 communicates with a chamber 49' in essentially the same manner as explained above that the valve housing outlet 47 in FIGS. 2 and 3 communicates with chamber 49. That is, the cover 51 with its dividing walls 53 separates the space radially about the valve housing 21 into a left chamber 49' and a right chamber 49 (see FIG. 7). The right chamber 49 as explained above is ultimately connected in fluid communication with the atmosphere through flow path 57 in FIG. 2. In a similar manner, chamber 49' through slots 55' and a flow path corresponding to 57 is also connected in fluid communication with the atmosphere. However, with the valve member 2 in its extreme, clockwise position of FIGS. 1-7, the opening 6 in the valve housing 21 is closed to communication with any of the portals (e.g., passageway 19, outlet 25, or inlet 43) in the valve housing 21. This is accomplished by the inclined, ramp member 10 of the valve member which is best seen in FIGS. 5 and 6. In this regard and with the valve member 2 in its extreme, clockwise position of FIGS. 6 and 7, the ramp member 10 prevents or blocks any fluid communication through valve opening 6 with any of the other portals (e.g., 19, 25, or 43) of the valve housing 21. The full negative pressure of the blower 33 can then be applied through passageway 19 to the chamber 15 in the shell 7.

Figure 11:
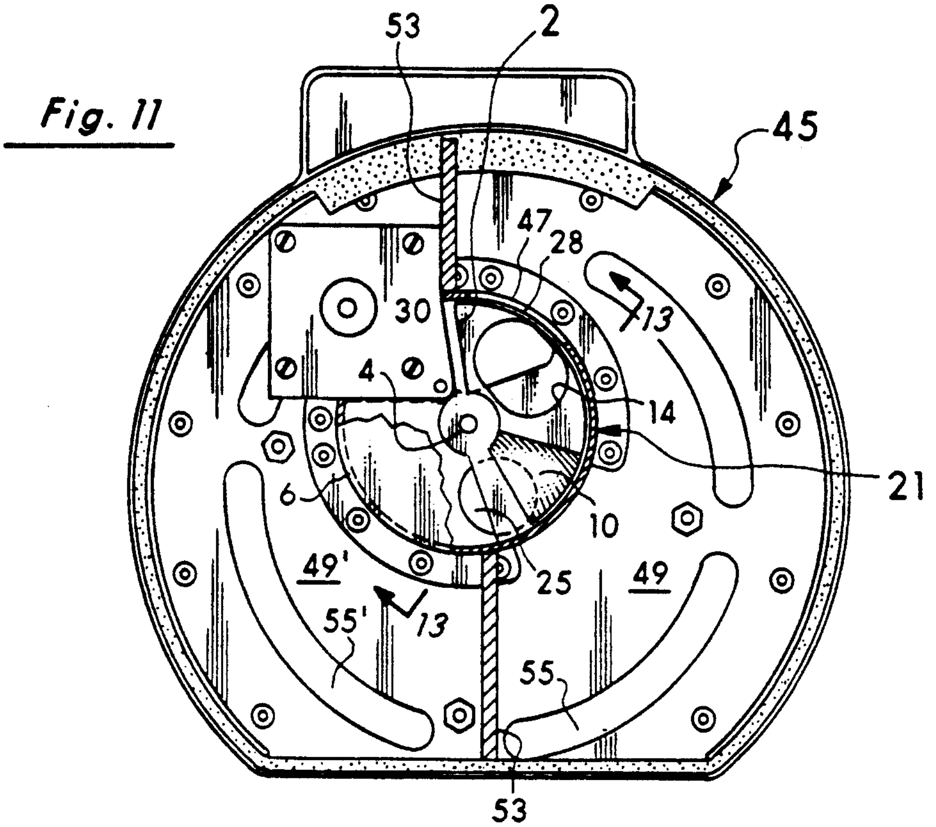
FIG. 11 illustrates the valving arrangement with the rotatable valve member in its extreme counterclockwise position.
Figure 12:
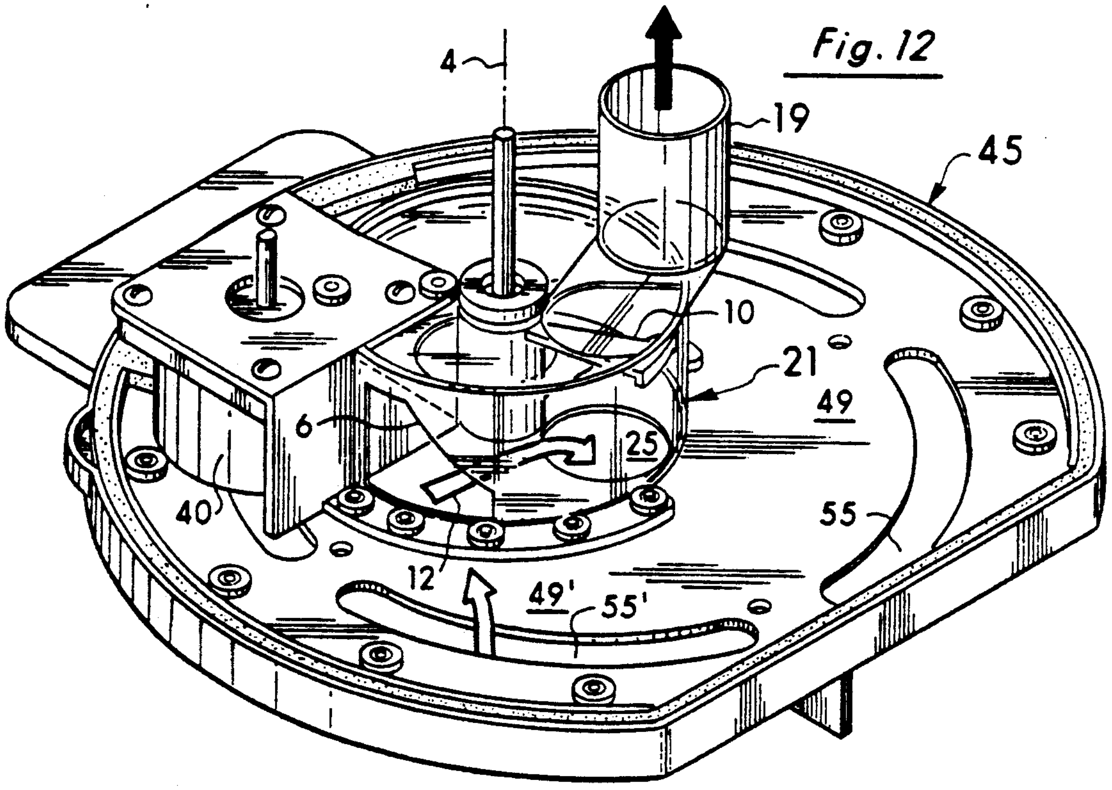
FIG. 12 is a perspective view of the assembled valving arrangement with the rotatable valve member in its extreme counterclockwise position.
Figure 13:
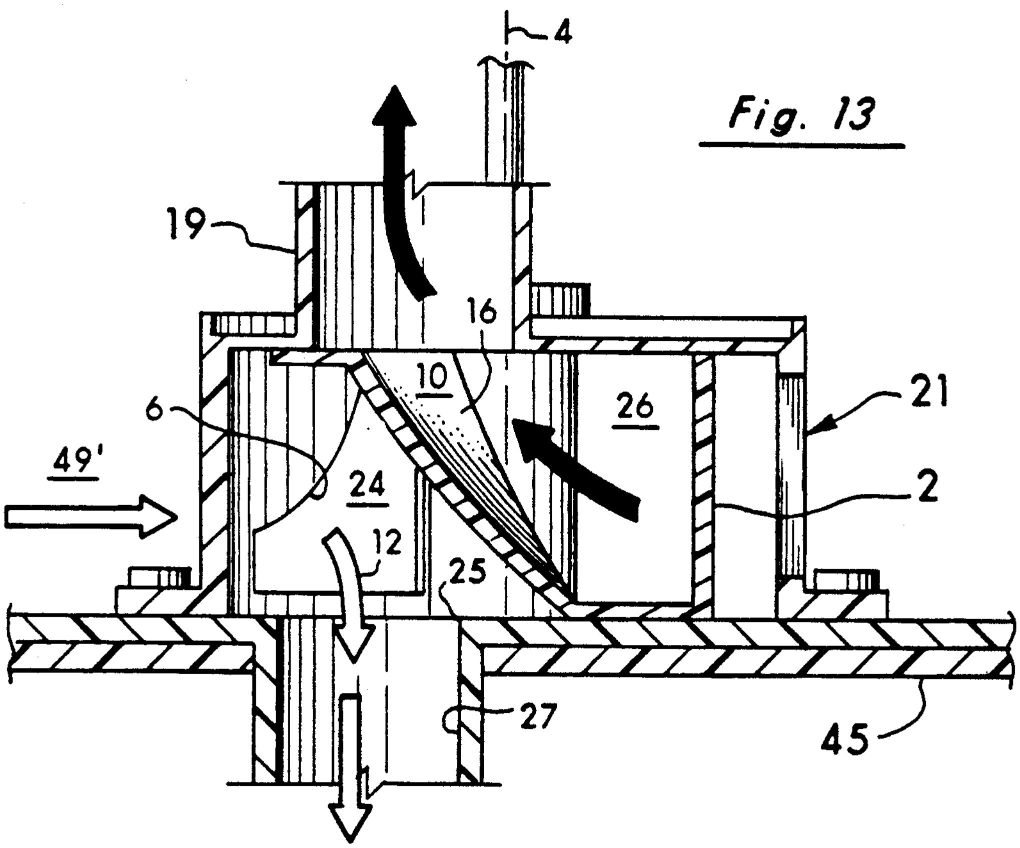
FIG. 13 is an enlarged view taken along line 13—13 of FIG. 11.

Conversely, with the valve member in its other extreme position (i.e., counterclockwise) of FIGS. 11 and 12, the flow path at 12 from the side opening 6 to the valve housing outlet 25 (which leads to the inlet 29 of the blower 33) is not blocked by the ramp member 10. Consequently, the flow negative pressure draw of the blower 33 is connected to ambient or atmospheric air via the valve housing portal 25, side opening 6, chamber 49', and slots 55'. At this position of valve member 2, its elongated hole 14 (see FIGS. 5 and 11) connects with the valve housing inlet 43. In this manner, the full positive pressure of the blower 33 is directed from the valve housing inlet 43 through the hole 14 past the upper side 16 (see also FIG. 13) of the ramp member 10 to the passageway 19 which in turn leads to the shell 7. FIG. 13 in this regard illustrates this flow through the valve housing 21 with the valve member 2 in this position from a view taken along line 13—13 of FIG. 11.

Normal Operation

Figure 7:
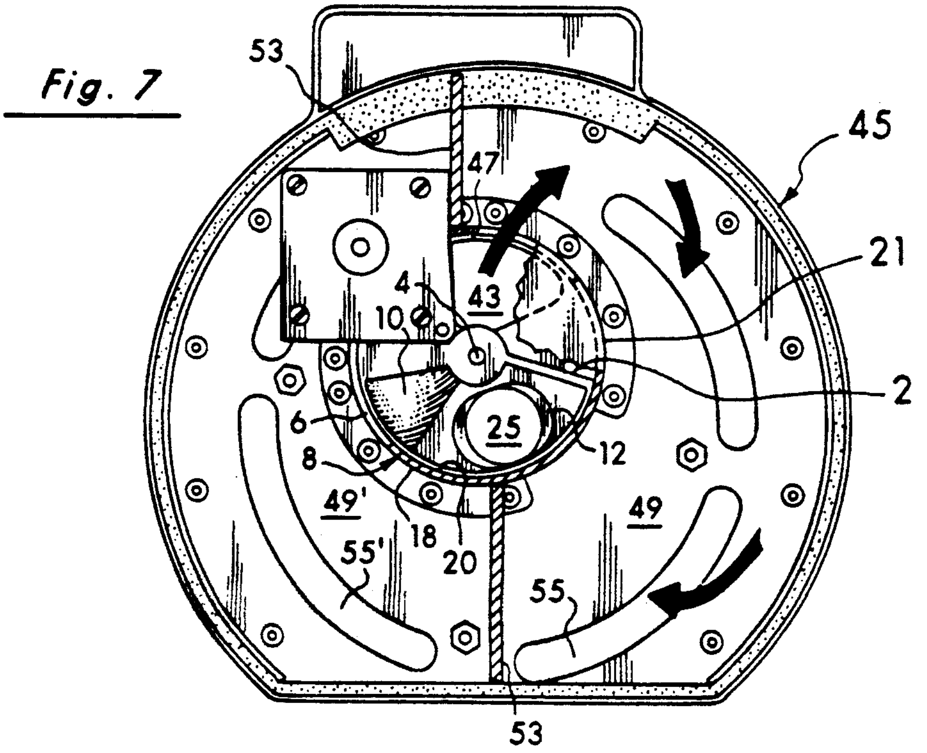
FIG. 7 is also a view of the valving arrangement with the rotatable valve member in its extreme clockwise position.
Figure 14:
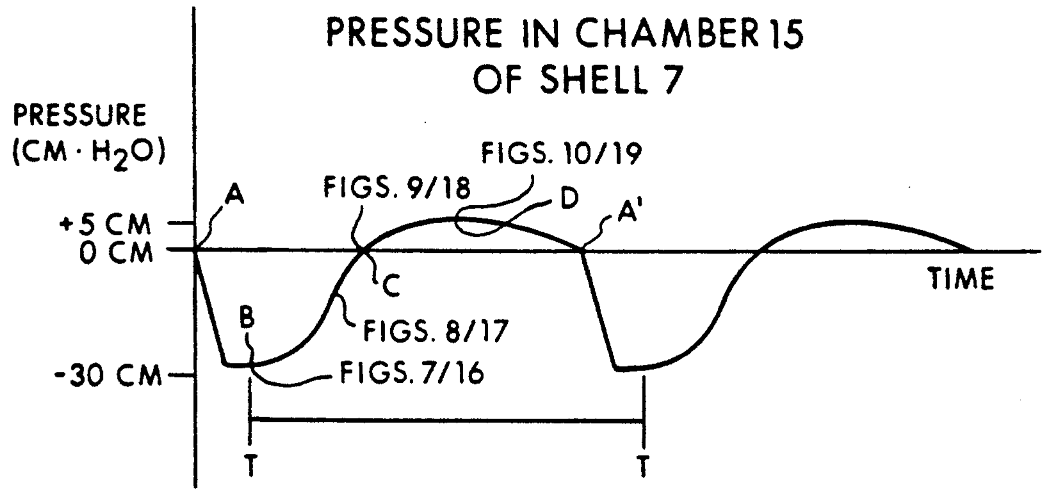
FIG. 14 illustrates the pressure gradient in the shell chamber during a typical operating cycle.

In a normal cycle of operation, the valve member 2 is moved between its extreme clockwise position of FIGS. 6 and 7 and a position approaching but not actually reaching its extreme counterclockwise position of FIGS. 11 and 12. That is, the most common mode of operation of the negative pressure ventilator 3 is intended to produce a pressure cycle in the chamber 15 of shell 7 such as shown in FIG. 14. In such a cycle, the pressure in the shell 7 changes between negative and positive, preferably abruptly to compensate for the resistance of the patient's chest wall. Also, the negative pressure side is preferably smaller in time (e.g., 40 percent of each cycle) and larger in relative pressure (e.g., negative 30 centimeters of water) than the positive pressure side (e.g., 60 percent in time and positive 5 centimeters of water). In this manner, the pressure in the shell chamber 15 is reduced to 30 centimeters of water in our example (i.e., from point A to point B in FIG. 14) causing the patient to breathe in or inhale. This negative pressure is then gradually relieved to zero (i.e., from point B to point C of FIG. 14) allowing the patient's chest to fall under its own weight and the patient to breathe out or exhale. Additionally, the cycle then continues to include a slight rise to a small positive pressure in the chamber 15 of 5 centimeters of water in our example (i.e., from point C to point D in FIG. 14) to slightly compress the patient's chest to aid his exhalation. Thereafter, the positive pressure is reduced to zero (i.e., from point D to point A' in FIG. 14) to begin a new cycle.

For clarity and in reference to the positioning of the rotatably mounted valve member 2, this normal cycle of operation is perhaps easier to understand, describe, and illustrate by following the cycle in FIG. 14 from trough to trough (i.e., line T—T in FIG. 14). More specifically, at the bottom of the trough, the valve member 2 is in its extreme clockwise position of FIGS. 6 and 7. In this position, the full negative pressure of the air blower 33 is being applied through passageway 19 and the connecting or primary flow channel 17 to the chamber 15 in shell 7. From there, the valve member 2 is rotated slightly counterclockwise to the position of FIG. 8. In this position, the ramp member 10 which completely sealed off portal 25 from chamber 49' in FIG. 7 has been moved to slightly uncover the valve housing outlet 25 (which in turn leads to the inlet 29 of the blower 33). The negative draw of the blower 33 then draws both from passageway 19 leading to the patient's shell 7 and from atmospheric air via side opening 6, chamber 49', and slots 55' leading to ambient air. The negative pressure in the shell 7 thus begins to be relieved (e.g., to 15 centimeters of water—see FIG. 14). Continued counterclockwise rotation of valve member 2 to FIG. 9 produces a zero draw through passageway 19 leading to the patient's shell 7. In the position of FIG. 9, the negative draw of the blower 33 is completely drawn from ambient air through chamber 49' and portal 25. Additionally, the exhaust or positive pressure discharged from the blower 33 is directed through valve housing outlet 47 to chamber 49 to atmosphere. The cycle to the shell 7 is thus at a dead spot (i.e., zero, no negative or positive pressure being applied through passageway 19 into shell 7). Further rotation of valve member 2 counterclockwise to FIG. 10 then slightly connects part of the positive pressure discharge at 43 from the blower 33 to the elongated hole 14 of the valve member 2. A slight positive pressure (e.g., 5 centimeters of water) is thus driven or directed to passageway 19 leading to the shell 7 to assist the patient in exhalation. The valve member 2 is then rotated back clockwise in essentially a mirror image manner to again reach a negative pressure trough in our example of 30 centimeters of water.

In normal operation, FIG. 10 is as far counterclockwise as the valve member 2 is rotated in a cycle. This is true because patients rarely need the full positive pressure of the blower 33 (e.g., 30 centimeters of water) applied to them. Yet, the capacity to do so is built into the valving arrangement 23 of the present invention. That is, if desired, the valve member 2 can be moved to the extreme counterclockwise position of FIGS. 11 and 12 wherein the valve housing outlet 47 is completely blocked and all air from the blower 33 is directed or driven through hole 14 in the valve member 2 into the passageway 19 leading to the patient's shell 7. This position could be used to apply the full positive pressure to the patient or simply to rapidly relieve the pressure or shell by bringing it very rapidly back to zero.

Schematic Description Of Valve Operation

Figure 15:
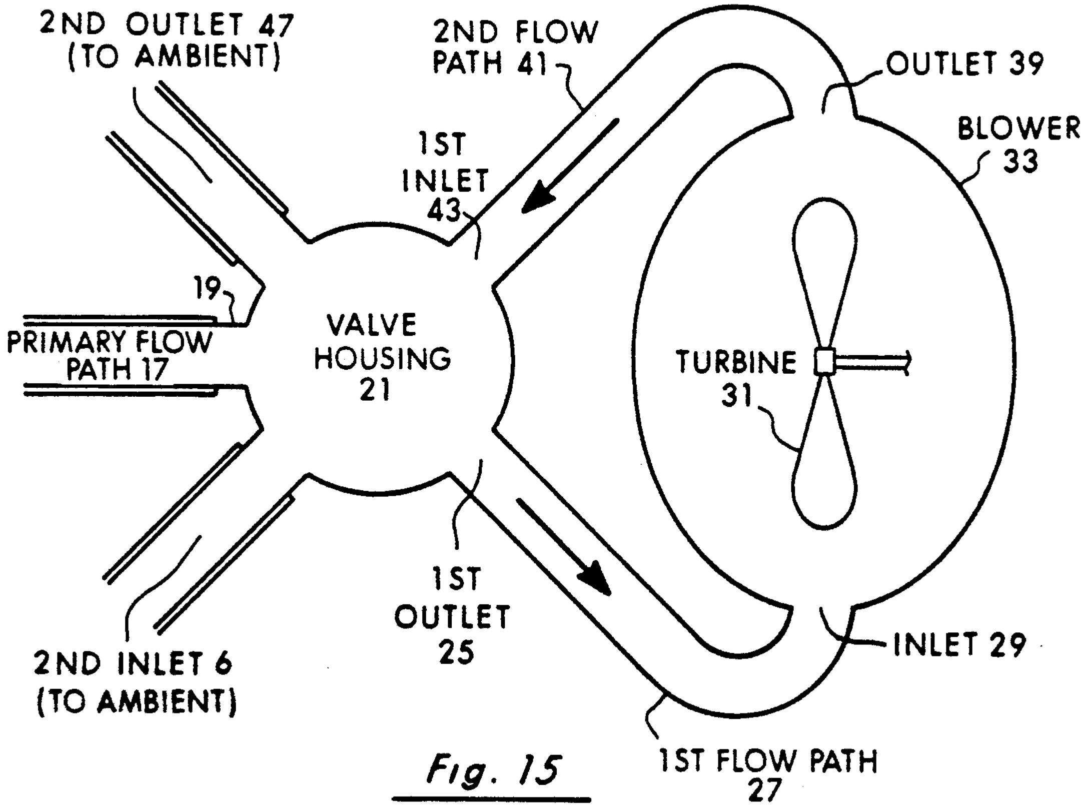
FIG. 15 is a two-dimensional schematic of the present invention.

For additional clarity, the operation of the valving arrangement 23 of the present invention has been illustrated in schematic form in FIGS. 15-20. FIG. 15 is a two-dimensional representation of the present invention. As shown in it, the connecting tube or primary flow channel 17 to the patient is connected to the passageway 19 of the valve housing 21. This passageway 19 for clarity has been described as a separate part to give a reference point of where the primary flow channel 17 enters the valve housing 21. However, passageway 19 and primary flow channel 17 could simply be portions of the same or continuous tube. In any event, the valve housing 21 then has a first outlet 25 in the schematic of FIG. 15 leading through a first flow path 27 to the blower inlet 29. The positive pressure air from the blower outlet 39 is directed through the second flow path 41 to the first inlet 43 of the valve housing 21. Additionally, valve housing 21 has a second outlet 47 connected via chamber 49 and slots 55 to ambient air. Valve housing 21 in the schematic of FIG. 15 also has a second inlet (i.e., side opening 6 in the valve housing 21) connected via chamber 49′ and slots 55′ to ambient air.

Figure 16:
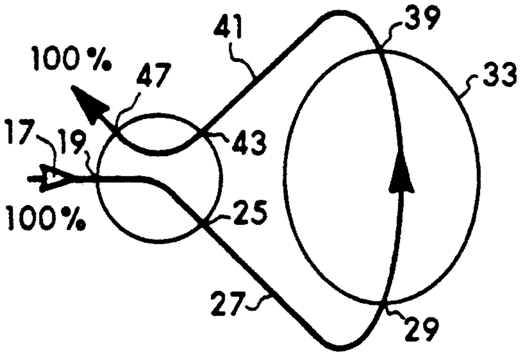
FIGS. 16–20 are two-dimensional schematic representations of the operation of the valving arrangement of the present invention. Schematic FIGS. 16–19 correspond to FIGS. 7–10.
Figure 17:
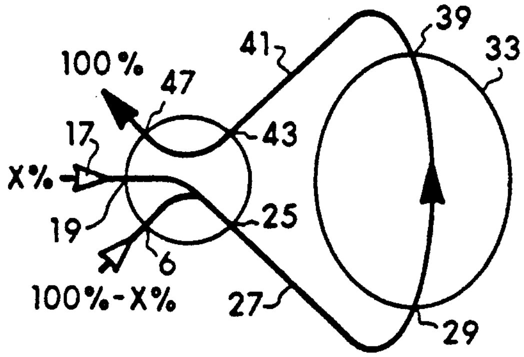

In operation in the two-dimensional schematics of FIGS. 15-20, the valving arrangement 23 can first be positioned as shown in FIG. 16 to draw 100% of the negative pressure of the blower 33 through the primary flow channel 17 leading to the patient's shell 7. In this position of FIG. 16, 100% of the positive pressure air from the blower 33 is exhausted through the second valve housing outlet 47 to atmosphere. FIG. 16 thus corresponds to FIGS. 1-7. Thereafter, the valve member 2 can be rotated counterclockwise to the second position of FIG. 8 which is schematically shown in FIG. 17. In this position, air is drawn both from the primary flow channel 17 and the second valve housing inlet 6. In this regard, the valve member 2 can be rotated or positioned to draw any desired proportion of air (e.g., 75% from the primary flow channel 17 and 25% from opening 6 or whatever) but it is intended to draw 100% of the demand of the blower 33 only from these two sources (i.e., X% from 17 and 100%−X% from 6). The valve member 2 is thereafter rotated to its neutral or dead spot of FIGS. 9 and 18 with the blower 33 drawing 100% of its negative flow from atmosphere through the second valve housing inlet 6 and discharging 100% of its positive flow to atmosphere through the second valving outlet 47. In this position, the valving arrangement 23 completely bypasses any communication with the patient through the primary flow channel 17 and the air for the blower 33 is drawn entirely from ambient air and the air from the blower 33 is discharged entirely to the ambient air. This neutral position with its by-pass flow is desirable as the blower 33 is not working against a dead space. Consequently, the by-pass flow in the neutral position helps to keep the blower 33 cool. Continuing rotation of valve member 2 to the third position of FIG. 10 (schematic FIG. 19) then serves to apply some positive pressure (e.g., Y% or enough to apply 5 centimeters of water) to the shell 7. However, the bulk (100%−Y%) of the positive pressure air in this position is being vented through the second valve housing outlet 47 to atmosphere. This movement through FIGS. 16-19 is then essentially reversed to complete a cycle.

Figure 20:
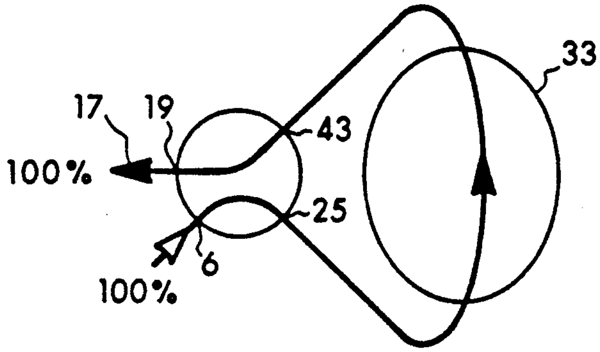

Schematic FIG. 20 illustrates the capacity of the valving arrangement 23 to position valve number 2 in its extreme counterclockwise position. This corresponds to FIGS. 11 and 12 and applies to the patient 100% of the ambient air being drawn through the second valve housing inlet 6 into the blower 33. As discussed above, however, this is not a normal step in the operation of the present invention but is available if desired and if required by the particular condition of the patient 1. For example, it may be desirable in certain cases to abruptly relieve the negative pressure to zero by infusing full positive pressure to the shell chamber 15.

Figure 18:
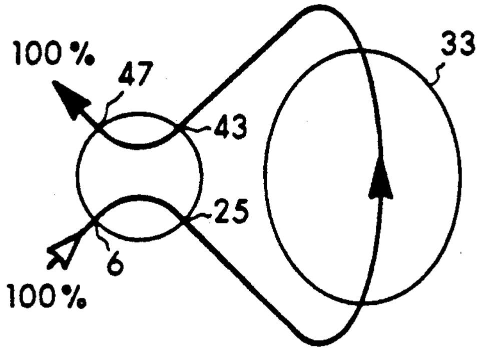
Figure 19:
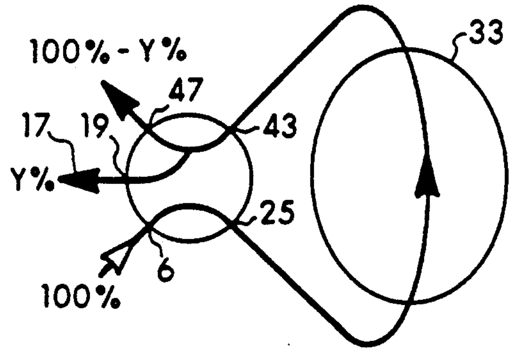

Schematic FIGS. 16-20 and in particular FIG. 18 also illustrates the preferred manner of operation of the valving arrangement 23. In it, the periodic delivery or flow of air is preferably managed without ever connecting the negative and positive sides of the blower 33 at the same time to the shell 7 on the patient's chest. Otherwise, the opposing pressures would work against one another trying both to inflate and deflate the patient's lungs at the same time. This is accomplished in the preferred embodiment by having a specific position of valve 2 (i.e., FIGS. 9 and 18) in which structure positively prevents the undesirable application of both positive and negative pressure to the patient 1.

Thus, the valving arrangement 23 of the present invention offers several distinct advantages over prior art devices. For example, the blower 33 in the system can be set at a single speed (e.g., 5,000 rpm's or a single speed blower 33 can simply be used) and the valving arrangement 23 can then deliver either positive or negative pressure to the patient 1 anywhere from zero to the maximum blower pressure (positive and negative). Additionally, if a servo motor is used, for example, this pressure delivery to the patient 1 can be infinitely adjusted by the valving arrangement 23. Further, the blower 33 can be operated at a slightly higher speed (e.g., 7,000 rpm's) to create a maximum pressure (e.g., 35 centimeters of water) in excess of the maximum pressure (e.g., 30 centimeters of water) normally applied to the shell chamber 15. In this mode of operation, the valve member 2 would not be moved to its extreme clockwise position during a normal cycle and would essentially operate between a cycle of just FIGS. 17 and 19. The disadvantage of running the blower 33 at such a higher speed and pressure is for the most part just increased noise. The advantage gained, however, is that the valve arrangement 23 can then compensate for leakage out of the shell chamber 15 (e.g., if the patient 1 moves or if the seal at the edge 11 changes).

In this regard, for example, if the desired maximum negative pressure in the shell chamber 15 is negative 30 centimeters of water and the blower 33 is run at negative 35 centimeters of water, the valve member 2 may then be rotated only to the position of FIG. 17 to draw the pressure down in shell chamber 15 to 30 centimeters of water. However, if a leak occurs or the size of the leak increases, the valve member 2 can simply be rotated farther clockwise to connect the tube 17 with, for example, 32 or the full 35 centimeters of water from the blower 33. This will then compensate for the leakage and maintain the maximum desired draw of 30 centimeters of water over the patient's chest in the shell chamber 15 as sensed by sensor 38. If the leakage or change in leakage is sudden, the valving arrangement 23 of the present invention can adjust to it virtually instantaneously by a simple movement of valve member 2. In contrast, prior single speed blowers normally cannot compensate for such leaks or must use separate valves or bleeders and prior adjustable speed blowers usually compensate for such leaks by reving up the blower to a higher speed which can often take several minutes. The valving arrangement 23 can therefore be used to enhance the operation of such adjustable blowers as well as less expensive, single speed blowers.

Other Details Of The Valving Arrangement And Its Operation

The valve housing 21 of the valving arrangement 23 as shown in FIG. 5 has a substantially cylindrical, curved wall 8 extending about and along the axis 4. The wall 8 has interior exterior, curved sides 18 and 20 (see FIG. 7) that also extend substantially about and along the axis 4 between the valve housing end walls 45′ and 22 (see FIG. 5). The valve housing end walls 45′ and 22 as illustrated extend substantially perpendicular to the axis 4. The valve member 2, in turn, is positioned within valve housing 21 between the end walls 45′ and 22; and, the passageway 19 as illustrated extends through the front end wall 22 (see FIG. 5). In the preferred embodiment, the first outlet 25 and first inlet 43 of the valve housing 21 pass through the back end wall at 45′; and, the second inlet 6 and second outlet 47 respectively pass through the cylindrical wall 8 of the valve housing 21.

The valve member 2 as disclosed above includes ramp member 10 which is inclined to the axis 4. Ramp member 10 extends between the two end walls 45′ and 22 and essentially divides the valving arrangement 23 internally into two chambers 24 and 26 (see FIG. 5). Chamber 24 is illustrated as always being to the left or clockwise from the dividing ramp member 10 in the figures and chamber 26 is illustrated as always being to the right or counterclockwise from the ramp member 10 in the figures. Curved portion 28 of valve member 2 (see FIG. 5) also helps to define chamber 26 and further serves with portion 30 to control and valve the valve housing outlet 47 (see FIGS. 10 and 11). In operation as discussed above, chamber 24 is always in fluid communication with the second inlet 6 of the valve housing 21 at least in the three valve positions of FIGS. 7, 8, and 10 and corresponding schematic FIGS. 16, 17, and 19. In all of these last-mentioned valve positions as shown, the ramp member 10 prevents fluid communication within the valve housing 21 between the valve and inlets 6 and 43. The other chamber 26 when the valve member 2 is in the third position of FIG. 10 (see also schematic FIG. 19) is always in fluid communication with the first inlet 43 of the valve housing 21 . In the neutral or dead spot position of FIGS. 9 and 18, chamber 26 is isolated from fluid communication with either portal 25 or 43 and in this position, neither positive nor negative pressure air is directed to the passageway 19 leading to the shell 7. That is, in this neutral position, the primary flow channel 17 to the patient 1 is closed.

The unique structure of the valving arrangement 23 allows the operator to easily program, adjust, and vary the operation of the system to meet a particular patient's needs. This is primarily a consequence of the fact that the operation of the system is essentially controlled by simply manipulating a single, one-piece valve member 2. In this light, for example, the cycle time and pressure limits of FIG. 4 can be set by simply adjusting knobs 32 of the programmable control unit 34 on the front of the negative pressure ventilator 3 of FIGS. 1 and 2. The pressure sensor 36 with its feedback sensor line 38 of FIGS. 1 and 2 then insures that the desired pressure settings at the chamber 15 are met. In the example of FIG. 14, the desired pressure limits to the patient are set between negative 30 centimeters of water and positive 5 centimeters of water. The turbine 31 is then run by motor 35 (which is also controlled by unit 34) to a speed (e.g., 5,000 rpm) that will generate negative 30 centimeters of water in chamber 15 (as sensed by sensor 36 through its sensor line 38). This is preferably at the extreme clockwise position of the valve 2 (i.e., position of FIGS. 1-7) which connects the full negative draw of the blower 33 to the shell 7. As a practical matter, the blower 33 is then being operated as quietly and cool as possible since it operating at the lowest speed to achieve the desired, maximum pressure.

Figure 8:
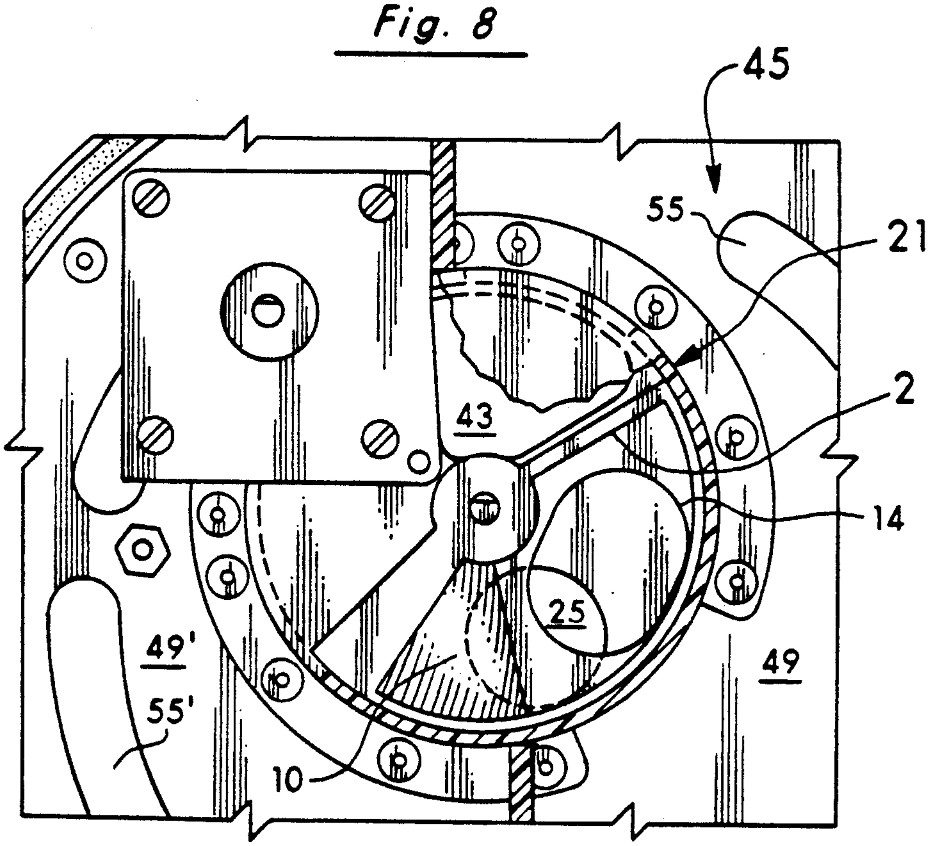
FIG. 8 illustrates the valving arrangement with its valve member turned slightly counterclockwise from the position of FIG. 7.
Figure 21:
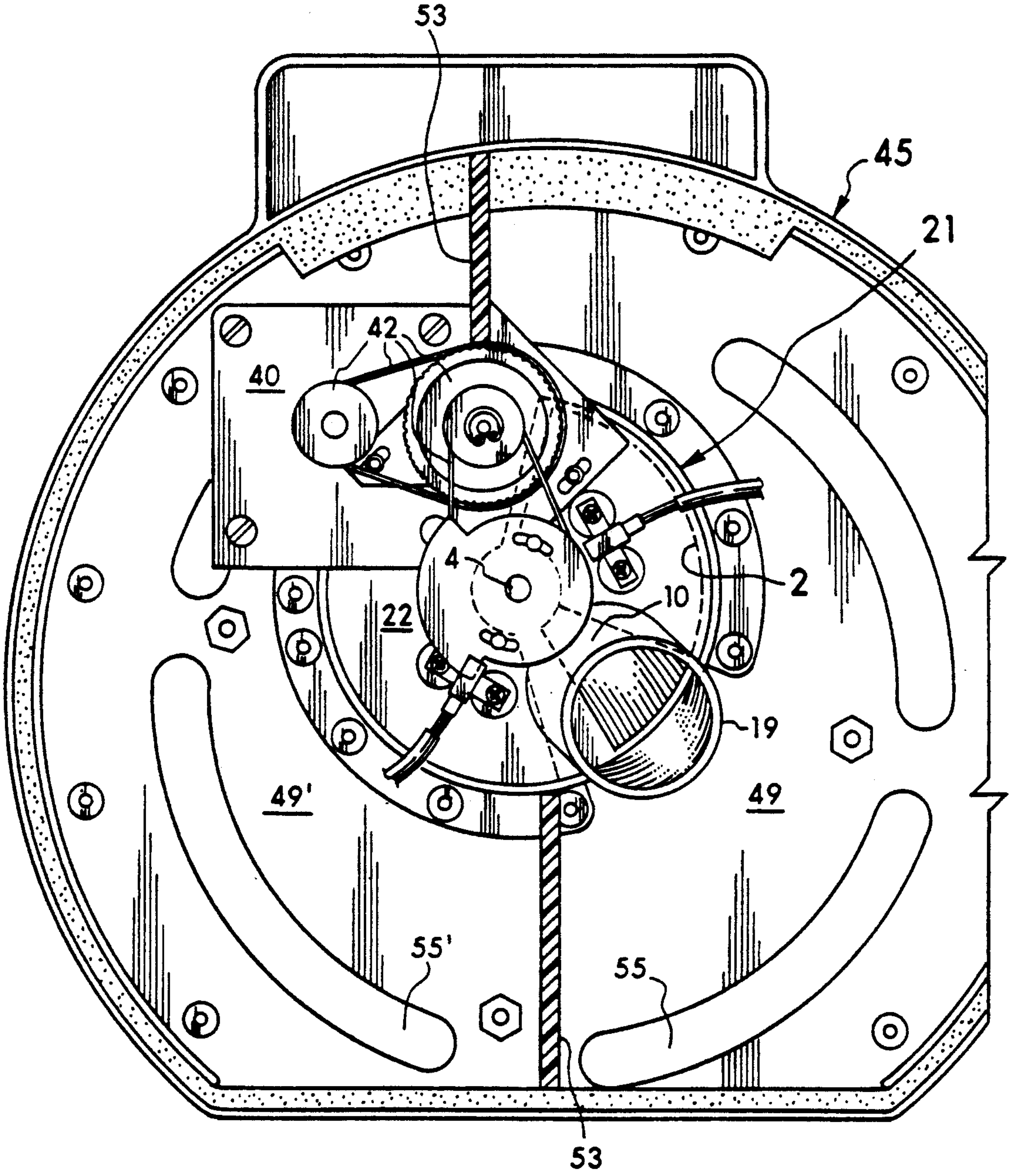
FIG. 21 illustrates the drive and pulley operation that manipulates the rotation of the valve member about its axis.

The speed and positioning of how the valve member 2 is then moved counterclockwise through FIGS. 8-10 is controlled in response to operation of the drive 40 (see FIGS. 2 and 21). The drive 40 (e.g., servo motor) as shown includes a simple belt and pulley arrangement 42 wherein valve member 2 is selectively rotated about axis 4. This is all controlled by the control unit 34 of FIG. 2 in cooperation with the feedback sensor 36 which seeks to create the pre-set, desired cycle of FIG. 14 in as smooth a manner as possible. This simplicity of operation and the infinite adjustability of valve member 2 enable the cycle or cycles to be set to include any number of variations. These may include such desirable features as a sigh function (e.g., a relatively large breath over a longer than normal time at a negative pressure greater than the negative 30 centimeters of water in our example). Such a sigh function can be accomplished by simply increasing the turbine speed from its normal rate of, for example, 5,000 rpm to 13,000 rpm and appropriately manipulating valve member 2 to its extreme clockwise position of FIGS. 1-7.

The cooperation between the sensor 36 with its feedback line 38 and the control unit 34 also automatically adjusts for leaks in the system (either continuous or temporary ones). It can do this by ramping up the turbine 31 to whatever speed is necessary to achieve the desired, maximum negative pressure at the chamber 15 in shell 7. The system also quickly adjusts to any size shell or other hard or soft covering (e.g., pancho, full body suit) on the patient. That is, the system automatically operates to create the pre-set pressure differentials in the shell 7 or other covering regardless of its volume. The operation can also include breaths in which more positive pressure is directed into the shell 7 to more fully compress the lungs. This can be accomplished by either rotating the valve member 2 counterclockwise beyond FIG. 10 to allow increased pressure to develop in shell 7. A cycle of operation could additionally be set at less than completely breathing for the patient so that he would have to work his muscles somewhat. All of this flexibility is easily achieved by the system of the present invention primarily because of the structure of the single, one-piece valve member 2 which can be easily, quickly, and accurately adjusted and controlled to move among infinitely variable positions.

While several embodiments of the invention have been shown and described in detail, it is to be understood that various modifications and changes could be made to them without departing from the scope of the invention.

We claim:

1. A valving arrangement primarily intended for use with an air blower means to selectively draw air through and drive air through a primary flow channel, said valving arrangement including:

air blower means having a main body with an inlet and outlet and means for moving air through said main body from said inlet to said outlet, said air at said inlet being at a negative pressure less than ambient air pressure and said air at said outlet being at a positive pressure greater than ambient air pressure, a primary flow channel, and valve means operably positioned between said air blower means and said primary flow channel, said valve means having a valve housing with at least first and second separate inlets, at least first and second separate outlets, and at least one passageway in fluid communication with said primary flow channel, said valving arrangement further including a first flow path for said negative pressure air extending between said first outlet of said valving housing and the inlet of said air blower means, a second flow path for said positive pressure air extending between the outlet of said air blower means and the first inlet of said valve housing, said second outlet of said valve housing and said second inlet of said valve housing being respectively in fluid communication with ambient air, and said valve means further including a single, one-piece valve member and means for moving said single valve member between at least two positions, said valve member in one position placing said first flow path in fluid communication through said passageway with said primary flow channel and through said second inlet of said valve housing in fluid communication with ambient air while placing said second flow path in fluid communication through the second outlet of said valve housing with ambient air to vent substantially all of said positive pressure air from said air blower means to ambient air and said valve member in another position placing said second flow path in fluid communication through said passageway with said primary flow channel and through said second outlet of said valve housing in fluid communication with ambient air while placing said first flow path in fluid communication through said second inlet to said valve housing with ambient air to draw ambient air through said second inlet in said valve housing into said air blower means through said first flow path.

2. The valving arrangement of claim 1 wherein said valve means includes means for mounting said single valve member within said valve housing.

3. The valving arrangement of claim 1 wherein said valve means includes means for mounting said single valve member for rotation about an axis.

4. The valving arrangement of claim 1 wherein said valve means includes means for mounting said single valve member within said valve housing for rotation about an axis.

5. The valving arrangement of claim 4 wherein said valve housing has a curved wall extending substantially about and along said axis and two end walls spaced from each other extending substantially perpendicular to said axis, said single valve member being positioned within said curved wall and between said end walls.

6. The valving arrangement of claim 5 wherein said curved wall has interior and exterior sides and said interior side is substantially cylindrical.

7. The valving arrangement of claim 5 wherein said passageway to said primary flow channel passes through one end wall, said first inlet and said first outlet of said valve housing pass through the other end wall, and said second inlet and second outlet of said valve housing pass through said curved wall.

8. The valving arrangement of claim 7 wherein said curved wall has interior and exterior sides and said interior side is substantially cylindrical.

9. The valving arrangement of claim 7 wherein said single valve member includes a dividing member extending along said axis substantially between said two end walls to form at least two chambers within said valve housing.

10. The valving arrangement of claim 9 wherein said dividing member is inclined relative to said axis.

11. The valving arrangement of claim 9 wherein one of said chambers is in fluid communication with the second inlet of said valve housing at each of said two positions of said single valve member.

12. The valving arrangement of claim 11 wherein the other of said chambers is in fluid communication with the first inlet of said valve housing at said another position of said single valve member.

13. The valving arrangement of claim 9 further including means for preventing fluid communication within said valve housing between the first and second inlets of said valve housing at said two positions of said valve member wherein said preventing means includes said dividing member of said single valve member.

14. The valving arrangement of claim 1 further including means for preventing fluid communication within said valve housing between the first and second inlets of said valve housing at said two positions of said valve member.

15. The valving arrangement of claim 1 wherein said moving means moves said single valve member to a neutral position wherein said valve member in said neutral position places said first flow path in fluid communication through said second inlet to said valve housing with ambient air while placing said second flow path in fluid communication through said second outlet of said valve housing and preventing flow of air through said passageway wherein all of the air drawn through said first flow path is vented to ambient air through said second outlet of said valve housing.

16. The valving arrangement of claim 1 wherein said moving means for said single valve member moves said single valve member to another position wherein said valve member places said second flow path in fluid communication through said passageway with said primary flow channel to deliver all of said positive pressure air from said air blower means through said primary flow channel while placing said flow path in fluid communication through said second inlet to said valve housing with ambient air to draw ambient air through said second inlet in said valve housing into the air blower means through said first flow path.

17. The valving arrangement of claim 1 wherein said air blower means is a turbine fan.

18. The valving arrangement of claim 1 wherein said moving means moves said single valve member to a further position placing said first flow path in fluid communication through said passageway with said primary flow channel to draw air through said primary flow channel to the inlet of said air blower means while placing said second flow path in fluid communication through the second outlet of said valve housing with ambient air to vent substantially all of said positive pressure air from said air blower means to ambient air.

19. The valving arrangement of claim 18 wherein said further position is a first position (1), said one position is a second position (2), and said another position is a third position (3) and wherein said moving means for said single valve member moves said single valve member among said positions from position (1) to (2) to (3).

20. The valving arrangement of claim 19 wherein said moving means for said single valve member moves said single valve member among said positions in a cycle of position (1) to (2) to (3) to (2) and back to (1) to begin a new cycle.

21. The valving arrangement of claim 19 wherein said moving means moves said single valve member to a fourth, neutral position wherein (4) said valve member in said fourth position places said first flow path in fluid communication through said second inlet to said valve housing with ambient air while placing said second flow path in fluid communication through said second outlet of said valve housing and preventing flow of air through said passageway wherein all of the air drawn through said first flow path is vented to ambient air through said second outlet of said valve housing.

22. The valving arrangement of claim 21 wherein said moving means for said single valve member moves said single valve member among said four positions in a cycle of position (1) to (2) to (4) to (3) to (4) to (2) and back to (1) to begin a new cycle.

23. The valving arrangement of claim 18 wherein said valve means includes means for mounting said single valve member within said valve housing.

24. The valving arrangement of claim 18 wherein said valve means includes means for mounting said single valve member for rotation about an axis.

25. The valving arrangement of claim 18 wherein said valve means includes means for mounting said single valve member within said valve housing for rotation about an axis.

26. The valving arrangement of claim 25 wherein said valve housing has a curved wall extending substantially about and along said axis and two end walls spaced from each other extending substantially perpendicular to said axis, said single valve member being positioned within said curved wall and between said end walls.

27. The valving arrangement of claim 26 wherein said curved wall has interior and exterior sides and said interior side is substantially cylindrical.

28. The valving arrangement of claim 26 wherein said passageway to said primary flow channel passes through one end wall, said first inlet and said first outlet of said valve housing pass through the other end wall, and said second inlet and second outlet of said valve housing pass through said curved wall.

29. The valving arrangement of claim 28 wherein said curved wall has interior and exterior sides and said interior side is substantially cylindrical.

30. The valving arrangement of claim 28 wherein said single valve member includes a dividing member extending along said axis substantially between said two end walls to form at least two chambers within said valve housing.

31. The valving arrangement of claim 30 wherein said dividing member is inclined relative to said axis.

32. The valving arrangement of claim 30 wherein one of said chambers is in fluid communication with the second inlet of said valve housing at each of said three positions of said single valve member.

33. The valving arrangement of claim 32 wherein the other of said chambers is in fluid communication with the first inlet of said valve housing at said third position of said single valve member.

34. The valving arrangement of claim 30 further including means for preventing fluid communication within said valve housing between the first and second inlets of said valve housing at said three positions of said valve member wherein said preventing means includes said dividing member of said single valve member.

35. The valving arrangement of claim 18 further including means for preventing fluid communication within said valve housing between the first and second inlets of said valve housing at said three positions of said valve member.

36. The valving arrangement of claim 18 wherein said moving means for said single valve member moves said single valve member to another position wherein said valve member places said second flow path in fluid communication through said passageway with said primary flow channel to deliver all of said positive pressure air from said air blower means through said primary flow channel while placing said flow path in fluid communication through said second inlet to said valve housing with ambient air to draw ambient air through said second inlet in said valve housing into the air blower means through said first flow path.

37. The valving arrangement of claim 18 wherein said air blower means is a turbine fan.

38. The valving arrangement of claim 18 wherein said air blower is a constant speed blower.

39. The valving arrangement of claim 1 wherein said air blower is a constant speed blower.

* * * * *